(12) United States Patent
Shafer

(10) Patent No.: US 6,700,491 B2
(45) Date of Patent: Mar. 2, 2004

(54) RADIO FREQUENCY IDENTIFICATION TAG WITH THIN-FILM BATTERY FOR ANTENNA

(75) Inventor: Gary Mark Shafer, Boca Raton, FL (US)

(73) Assignee: Sensormatic Electronics Corporation, Boca Raton, FL (US)

(*) Notice: Subject to any disclaimer, the term of this patent is extended or adjusted under 35 U.S.C. 154(b) by 0 days.

(21) Appl. No.: 10/172,255

(22) Filed: Jun. 14, 2002

(65) Prior Publication Data

US 2003/0231106 A1 Dec. 18, 2003

(51) Int. Cl.$^7$ .................. G08B 13/14; H01Q 21/00
(52) U.S. Cl. .................. 340/572.7; 340/572.1; 340/572.8; 343/726; 343/727; 343/728
(58) Field of Search .................. 340/572.7, 572.8, 340/572.1, 7.32, 7.33, 7.37, 10.1, 10.3, 10.33, 10.34; 343/700 R, 726–728, 795

(56) References Cited

U.S. PATENT DOCUMENTS

| | | | | |
|---|---|---|---|---|
| 5,338,625 A | | 8/1994 | Bates et al. | 429/193 |
| 5,719,586 A | * | 2/1998 | Tuttle | 343/726 |
| 6,045,652 A | * | 4/2000 | Tuttle et al. | 156/292 |
| 6,462,647 B1 | * | 10/2002 | Roz | 340/10.1 |
| 2001/0032666 A1 | | 10/2001 | Jenson et al. | 136/256 |

* cited by examiner

*Primary Examiner*—Jeffery Hofsass
*Assistant Examiner*—Lam Pham

(57) ABSTRACT

An active RFID label is provided in which the antenna also forms the battery for the RFID chip that is part of the label. The antenna can be made of one or both of the electrodes forming a thin-film lithium-ion battery. The RFID chip, antenna and battery can all be placed upon the same substrate, and because the antenna and battery are co-located, the substrate can be made relatively flexible.

11 Claims, 5 Drawing Sheets

Series Connection showing Decoupling Impedance "Z"

FIG. 1 - PRIOR ART

Typical RFID Chip

Series Batteries with Dipole Antenna

Parallel Batteries with Dipole Antenna

RADIO FREQUENCY IDENTIFICATION TAG WITH THIN-FILM BATTERY FOR ANTENNA

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This inventions relates to radio frequency identification (RFID) tags, and more particularly active RFID tags that include a battery and an antenna as integral parts thereof.

2. Description of the Related Art

Objects associated with inventory, product manufacturing, merchandising, and related operations create challenges for accurately monitoring of the location and flow of the objects. There is a continuing need to determine the location of these objects, and to track relevant information about the objects. A tag device suitably configured to be associated with any of a variety of objects, including goods, items, persons, or animals, or substantially any moving or stationary and animate or inanimate object, which facilitates location and data tracking, can be used. One such tag tracking system is an electronic identification system, such as RFID. RFID tags are attached, connected, or in some way associated with an object for the purpose of tracking the object, and storing and retrieving information about the object.

Information related to the object to which an RFID tag is attached can be written to and stored in memory in the RFID tag. The RFID tag will be detected in a suitable electromagnetic field, and the information stored in the tag can be read, and changed if desired. Typically, the RFID tag devices are entirely passive (have no onboard power supply), which results in a small and portable package. However, passive tags are only capable of operation over a relatively short range, limited by the size of the field used to supply power and to communicate with the tags.

An active RFID tag includes a power supply connected to the tag to increase the detectable range. However, with the addition of a battery the RFID tag becomes physically larger, and more expensive. RFID tags must be thin and flexible to maintain usefulness in many applications. Larger and more rigid tags will reduce the usefulness of the tag by restricting applications.

BRIEF SUMMARY OF THE INVENTION

The invention provides an active radio frequency identification label, which includes a radio frequency identification chip disposed on a substrate. A battery disposed on the substrate is connected to the radio frequency identification chip. At least a portion of the battery forms an antenna for the radio frequency identification chip.

The antenna can be a dipole antenna adapted for operation at microwave frequencies. Alternately, the antenna may operate at other than microwave frequencies, such as 8 MHz or 13.56 MHz.

The battery can be a thin-film battery. The thin-film battery may be a lithium-ion battery.

The battery typically includes two electrodes separated by an electrolyte, and the antenna is formed from at least one of the electrodes.

The antenna and the battery can be substantially co-located on the substrate so that the battery does not take up any additional space.

A method for powering the a radio frequency identification label, includes providing a radio frequency identification label including a radio identification chip disposed on a substrate and including a thin-film battery, a portion of the battery forming an antenna for the radio frequency identification chip. And placing the radio frequency identification label in a radio frequency identification electromagnetic field formed by a radio frequency identification reader. Where the radio frequency identification electromagnetic field powers the radio frequency identification chip whenever the power available from the field is greater than the power available from the battery. And where the battery powers the radio frequency identification chip whenever the power available from the field is less than the power available from the battery.

The method for powering further provides charging the battery whenever the power available from the radio frequency identification electromagnetic field is greater than the power available from the battery.

Objectives, advantages, and applications of the present invention will be made apparent by the following detailed description of embodiments of the invention.

DETAILED DESCRIPTION OF THE INVENTION

Figure 1:
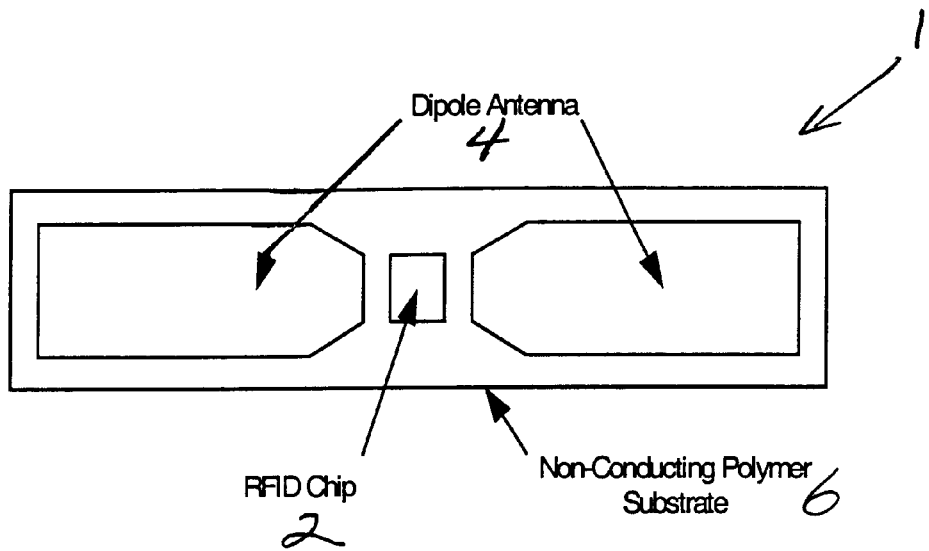
FIG. 1 is top plan view of a prior art microwave RFID label.

Referring to FIG. 1, conventional passive microwave RFID label 1 is used herein to illustrate the invention. Microwave RFID label 1 includes RFID chip 2 and dipole antenna 4 mounted to non-conducting polymer substrate 6. If microwave RFID label 1 were made active, a battery would be added as an additional element of the label. However, the battery will affect operation of the antenna 4, which requires the battery to be located some distance from the antenna 4, resulting in a larger label. Conventional active labels are typically relatively rigid or non-flexible due to the mounting requirements of the battery being spaced from the antenna.

Figure 2:
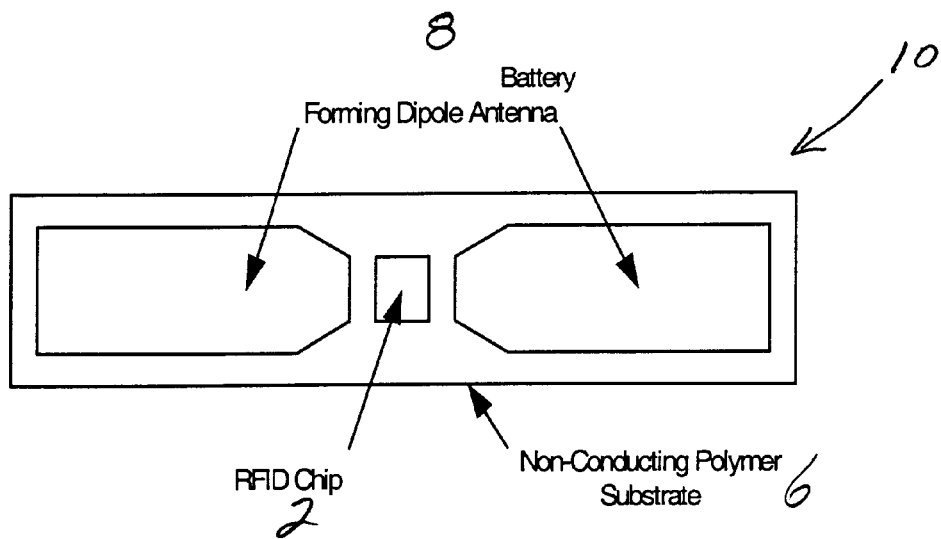
FIG. 2 is a top plan view of one embodiment of the present invention.

Referring to FIG. 2, active microwave RFID label 10, as further described hereinbelow, provides a thin-film battery 8 that forms the dipole antenna 4 shown in FIG. 1. Because the antenna and battery are formed as one co-located structure, the substrate 6 can be made relatively more flexible than conventional active RFID labels. Flexible RFID labels offer more applications than larger more rigid labels. Suitable thin-film batteries, such as solid state lithium-ion batteries shown in U.S. Patent Application Publication No. US2001/0032666A1 and U.S. Pat. No. 5,338,625, are constructed of a substrate mounted cathode and anode separated by an electrolyte. In lithium-ion batteries, lithium ions are resident in a crystalline structure of the anode material. During discharge, lithium ions flow through the electrolyte material and are taken up by the crystalline structure of the cathode. Charging the battery reverses the ion flow. Lithium-ion batteries are suitable for micro-batteries and are formed onto a substrate using processes that are compatible with semiconductor processing. The materials of the anode, cathode, and electrolyte are beyond the scope of this application, and the reader is directed to the '32666 application and the '625 patent above for further details. Suitable thin-film lithium ion batteries may be purchased from Cymbet Corporation of Elk River, Minn. For example, a minimum 3-volt DC battery with a capacity of 0.74 mAh/cm$^2$ having a thickness of 0.03 mm is available, with other configurations possible depending on the size of area available for the antenna/battery. Even a tiny area of film battery provides enough power to operate a backscatter RFID label for several read cycles. The specific battery selected to form the antenna may be other than a thin-film lithium ion battery. The primary restriction on the batteries is that at least the anode or cathode, or preferably both, must be sufficiently conductive at the frequency of operation to form a usable antenna for the RFID chip.

Figure 3:
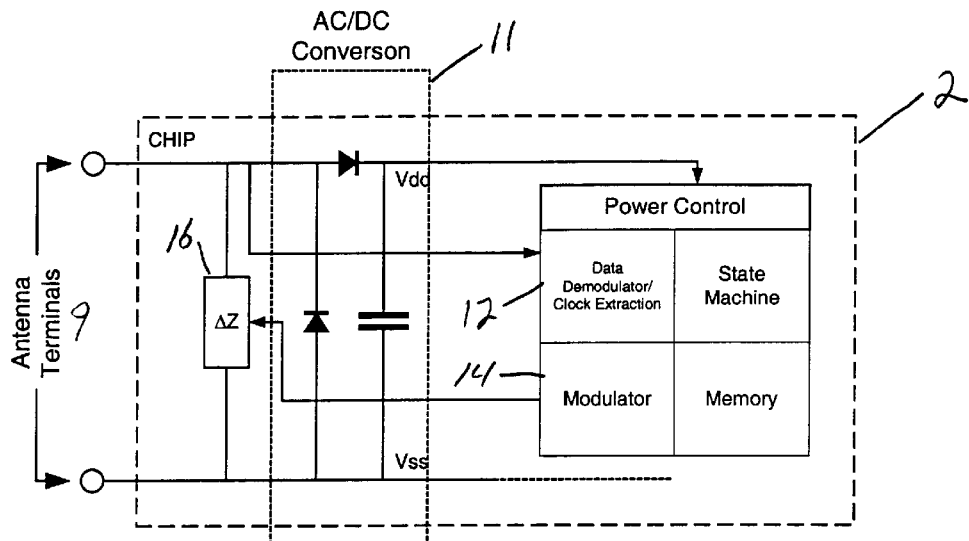
FIG. 3 is a schematic diagram of a prior art RFID chip.

Referring to FIG. 3, conventional RFID chip 2 includes antenna terminals 9, which receive the RF energy picked up by the antenna when in the RF interrogation field of an RFID reader, as known in the art. AC to DC converter 11 provides power to the RFID chip 2 directly from the RF interrogation field. The data contained in the RF energy of the interrogation field is demodulated by a demodulator 12 contained in chip 2. Information contained in the response of chip 2 to the RFID interrogation field is modulated on the chip at 14 and transmitted to the antenna terminals 9 through matching impedance 16.

Figure 4:
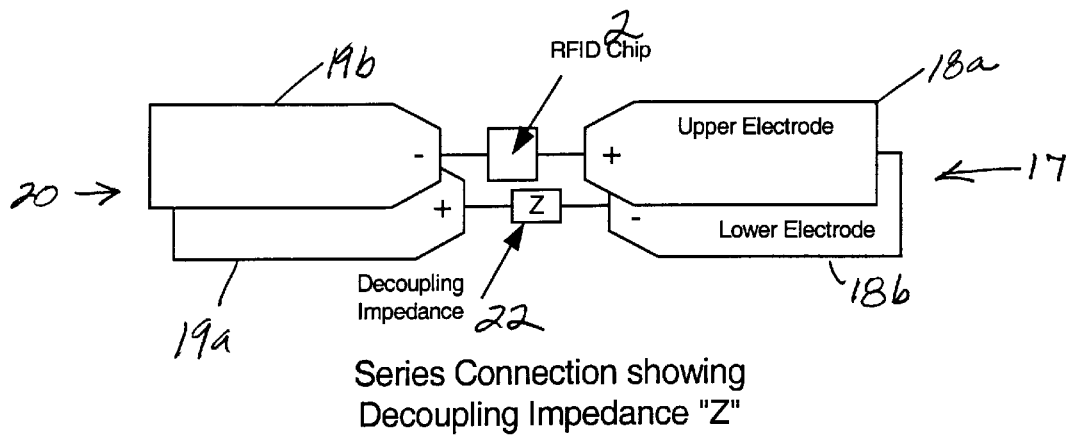
FIG. 4 is a partial top perspective view of one embodiment of the present invention.

Referring to FIG. 4, an embodiment for a series connection of the present invention is illustrated. Battery 17 is formed by upper electrode 18a and lower electrode 18b, and battery 20 is formed by upper electrode 19a and lower electrode 19b. The electrolyte disposed between the upper and lower electrodes and the substrate to which everything is formed onto are not shown for simplicity. De-coupling impedance 22 is needed to de-couple the battery function from the antenna function, as fully described below.

Figure 5:
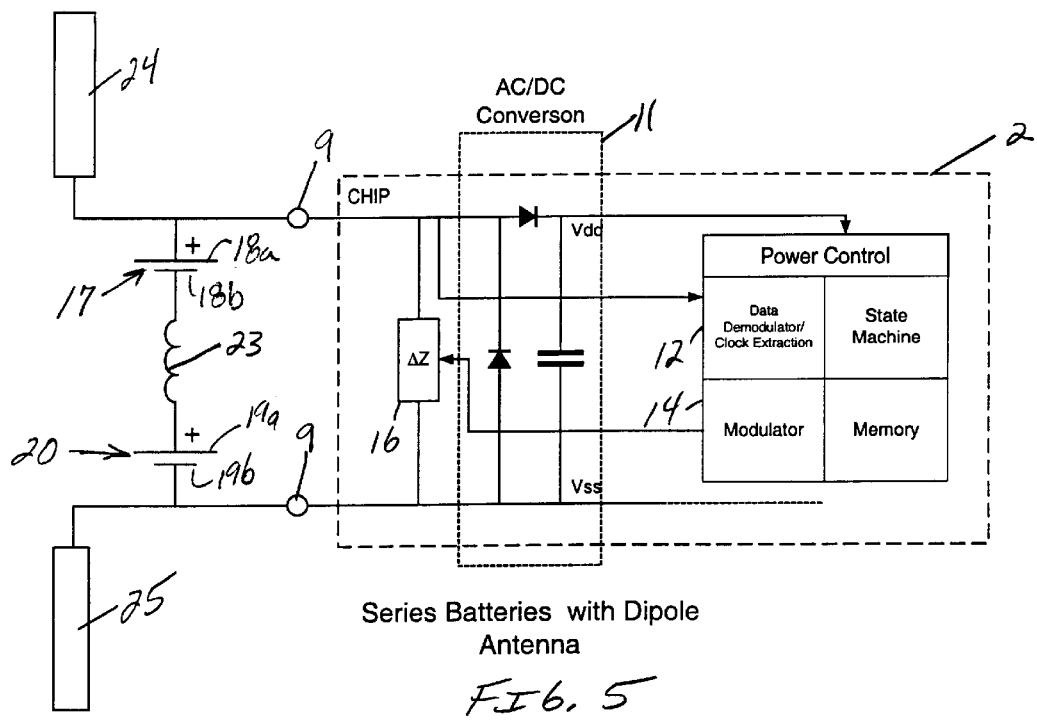
FIG. 5 is a schematic diagram of a series connection of the present invention.

Referring to FIG. 5, further details of the series configuration of FIG. 4 are shown. RFID chip 2 is connected to dipole antenna elements 24 and 25, which are part of upper electrode 18a and lower electrode 19b, respectively. One choice for de-coupling impedance 22 is inductor 23, which de-couples, or separates the RF and DC components to antenna terminals 9. The de-coupling impedance is not limited to an inductor, but can be any discrete or distributed circuit, or active circuit, that can separate the RF and DC components of the incident energy received at the antenna. If the RF energy received at antenna terminals 9 is higher than the power level available from batteries 17 and 20, the RF field will power the RFID chip 2 through AC/DC converter 11, as in a conventional passive RFID label. This incident RF field will also charge batteries 17 and 20 while data is transferred to and from chip 2. If the RF energy received at terminals 9 is less than that supplied by batteries 17 and 20, the batteries will power the chip 2 during the transfer of data. The range of an active label configured in this manner will be dramatically increased as compared to the conventional passive RFID label. Batteries 17 and 19 will be charged, and the label will behave as a passive RFID label whenever the label is in proximity of the RFID reader, and will behave as an active RFID label when more distant from the reader.

Figure 6:
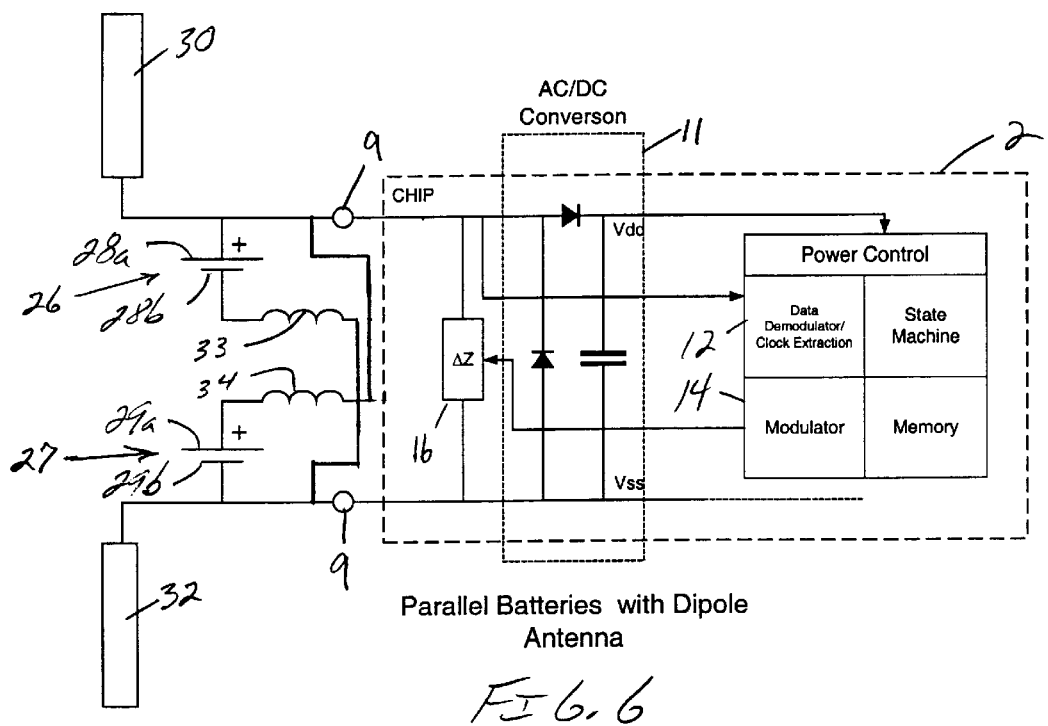
FIG. 6 is a schematic diagram of a parallel connection of the present invention.

Referring to FIG. 6, an alternate embodiment for a parallel connection of the preset invention is illustrated. Battery 26 is formed by upper electrode 28a and lower electrode 28b, and battery 27 is formed by upper electrode 29a and lower electrode 29b. Antenna element 30 is part of upper electrode 28a. Antenna element 32 is part of lower electrode 29b. Inductors 33 and 34 perform the de-coupling impedance function to separate the RF and DC components of antenna elements 30 and 32. Similarly to that described above for FIG. 5, if the RF energy received at antenna terminals 9 is higher than the power level available from batteries 26 and 27, the RF field will power the RFID chip 2 through AC/DC converter 11. And batteries 26 and 27 will be charged while data is transferred to and from chip 2. If the RF energy received at terminals 9 is less than that supplied by batteries 26 and 27, the batteries will power the chip 2 during the transfer of data.

A microwave RFID label is used to describe the invention with respect to the embodiments shown in FIGS. 4–6. Microwave RFID labels typically operate in RF frequencies above about 1 GHz. However, the invention is easily adapted to RFID labels operating in other frequency ranges.

Figure 7:
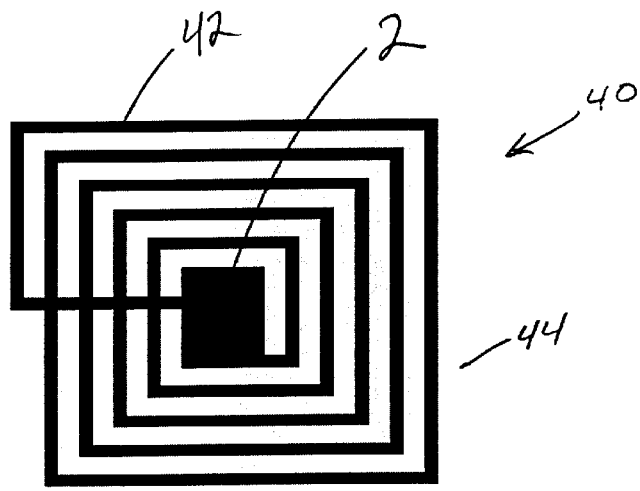
FIG. 7 is a top plan view of an alternate embodiment of the present invention for operating frequencies other than microwave.

Referring to FIG. 7, an RFID label 40 is illustrated, which operates at frequencies other than microwave, such as conventional RFID frequencies of about 8 MHz and about 13.56 MHz. RFID label 40 includes RFID chip 2, antenna element 42, and substrate 44. According to the present invention, antenna element 42 can also function as a battery for RFID chip 2.

Figure 8:
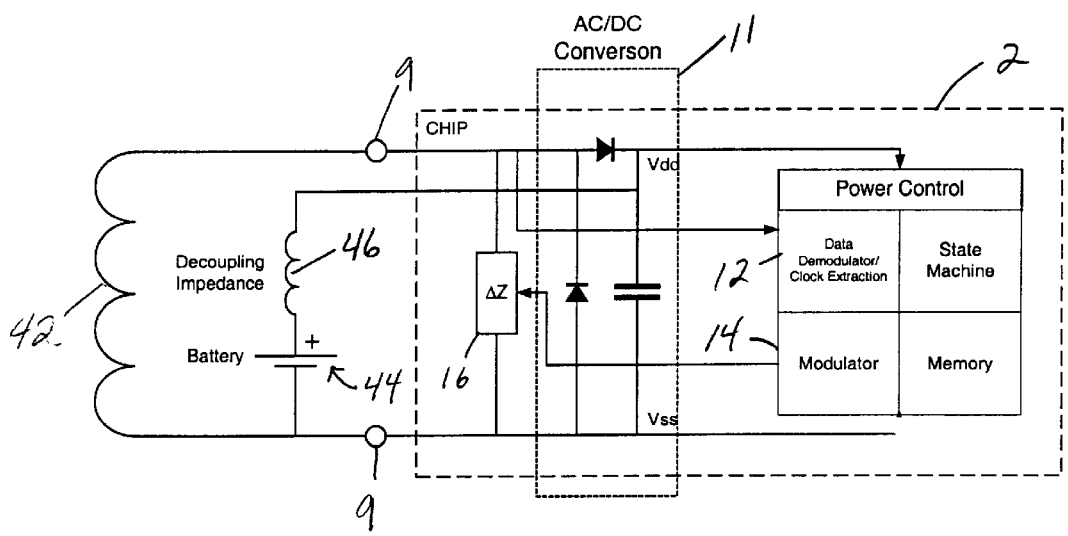
FIG. 8 is schematic diagram of an alternate embodiment of the present invention for operating frequencies other than microwave.

Referring to FIG. 8, RFID chip 2, is functionally identical to the RFID chips shown herein, which are used for example to refer to any conventional RFID chip. It should be understood that the exact RFID chip used with the invention might structurally vary from RFID chip 2 illustrated herein. Antenna element 42, which is build onto substrate 44 forms an electrode of battery 44. A second electrode separated from the first by an electrolyte all formed on substrate 44 complete the formation of battery 44. The particular electrode selected for antenna element 42 may vary from that shown. De-coupling inductor 46 is used to separate RF data incident on antenna terminal 9 from the DC power supplied to RFID chip 2 by battery 44. As in the other embodiments herein, de-coupling impedance 46 can be implemented in a variety of different ways. Similar to the microwave labels, the RFID chip 2 will be powered by the greater of the incident RF energy or the power supplied by battery 44. The battery 44 will be charged simultaneously with data transfer if the RF energy is sufficiently high, such as when the label is near to an RFID reader.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. An active radio frequency identification label, comprising:
   a radio frequency identification chip disposed on a substrate;
   a battery connected to said radio frequency identification chip, said battery disposed on said substrate, wherein at least a portion of said battery forms an antenna for said radio frequency identification chip;
   wherein a radio frequency identification electromagnetic field powers said radio frequency identification chip whenever power available from said field is substantially greater than power available from said battery, and wherein said battery powers said radio frequency identification chin whenever the power available from said field is substantially less than the power available from said battery.

2. The label of claim 1 wherein said antenna is a dipole antenna adapted for operation at microwave frequencies.

3. The label of claim 1 wherein said antenna operates at 8 MHz or 13.56 MHz.

4. The label of claim 1 wherein said battery is a thin-fun battery.

5. The label of claim 4 wherein said tin-film battery is a lithium-ion battery.

6. The label of claim 5 wherein said battery includes two electrodes separated by an electrolyte, said antenna is formed from at least one of said electrodes.

7. The label of claim 1 wherein said antenna and said battery are substantially co-located on said substrate.

8. The label of claim 1 wherein said substrate is relatively flexible.

9. The label of claim 1, wherein said battery is charged whenever the power available from said radio frequency identification electromagnetic field is greater than the power available from said battery.

10. A method of powering a radio frequency identification label, comprising:
    providing a radio frequency identification label including a radio identification chip disposed on a substrate and including a thin-film battery, a portion of said battery forming an antenna for said radio frequency identification chip;
    placing said radio frequency identification label in a radio frequency identification electromagnetic field Conned by a radio frequency identification reader, wherein said radio frequency identification electromagnetic field powers said radio frequency identification chip whenever the power available from said field is greater than the power available from said battery, and wherein said battery powers said radio frequency identification chip whenever the power available from said field is less than the power available from said battery.

11. The method of claim 10 further comprising charging said battery whenever the power available from said radio frequency identification electromagnetic field is greater than the power available from said battery.

* * * * *